(12) United States Patent
Muzzo

(10) Patent No.: US 9,004,444 B2
(45) Date of Patent: Apr. 14, 2015

(54) DEVICE FOR THE HYDROPNEUMATIC CONTROL OF A VALVE WITH A PNEUMATIC LOCKING MEANS

(75) Inventor: Paul Muzzo, Yutz (FR)

(73) Assignee: Luxembourg Patent Company S.A., Luxembourg (LU)

( * ) Notice: Subject to any disclaimer, the term of this patent is extended or adjusted under 35 U.S.C. 154(b) by 762 days.

(21) Appl. No.: 13/203,520

(22) PCT Filed: Feb. 26, 2010

(86) PCT No.: PCT/EP2010/052461
§ 371 (c)(1),
(2), (4) Date: Aug. 26, 2011

(87) PCT Pub. No.: WO2010/097456
PCT Pub. Date: Sep. 2, 2010

(65) Prior Publication Data
US 2011/0309283 A1    Dec. 22, 2011

(30) Foreign Application Priority Data

Feb. 27, 2009  (LU) .......................................... 91535

(51) Int. Cl.
*F16K 1/00*      (2006.01)
*F16K 31/122*   (2006.01)

(52) U.S. Cl.
CPC *F16K 31/122* (2013.01); *F16K 1/00* (2013.01)

(58) Field of Classification Search
CPC ....................................................... F16K 1/00
USPC .............. 251/63.6, 57, 62, 63.4, 63.5; 91/418
See application file for complete search history.

(56) References Cited

U.S. PATENT DOCUMENTS

| | | | |
|---|---|---|---|
| 2,972,984 A * | 2/1961 | Heyn et al. ............... | 137/625.68 |
| 3,291,002 A * | 12/1966 | Folkerts ..................... | 91/375 A |
| 3,807,687 A * | 4/1974 | Thompson ................ | 251/149.4 |
| 4,073,944 A * | 2/1978 | Dawson ..................... | 425/146 |
| 4,513,875 A * | 4/1985 | Kuehn, Sr. ................. | 220/214 |
| 4,585,207 A * | 4/1986 | Shelton ...................... | 251/62 |
| 4,763,690 A | 8/1988 | Martin | |
| 5,060,108 A * | 10/1991 | Baker et al. ............... | 361/283.4 |
| 5,170,693 A * | 12/1992 | Stary ........................... | 92/5 R |
| 5,186,393 A * | 2/1993 | Yie .............................. | 239/583 |
| 6,997,209 B2 * | 2/2006 | Ejiri ............................ | 137/556 |

FOREIGN PATENT DOCUMENTS

EP       1426626 A1   6/2004

OTHER PUBLICATIONS

International Search Report from PCT/EP10/52461, Jun. 5, 2010.

\* cited by examiner

*Primary Examiner* — John K Fristoe, Jr.
*Assistant Examiner* — Christopher Ballman
(74) *Attorney, Agent, or Firm* — James E. Walton

(57) ABSTRACT

Valve control device includes a body with a longitudinal axis, a control member housed at least partially in the body in a bottom portion along the longitudinal axis, a piston movable along the longitudinal axis and housed in a portion of the body forming with the piston a control chamber of the piston, an element movable in rotation with respect to the longitudinal axis on a top portion of the body, and sealing means between the movable element and the control chamber in the area of the connection port and/or of the passage.

14 Claims, 2 Drawing Sheets

DEVICE FOR THE HYDROPNEUMATIC CONTROL OF A VALVE WITH A PNEUMATIC LOCKING MEANS

TECHNICAL FIELD

The invention relates to a valve control device, more particularly to a pressurized fluid control device, yet more particularly a pressurized fluid control device comprising a demultiplication of the control force and/or of the mechanical locking means.

STATE OF THE ART

Various devices for pneumatic valve control are known to the state of the art.

Document U.S. Pat. No. 4,763,690 discloses such a device coupled with a valve for a pressurized gas bottle. This control device comprises a body adapted to be affixed to the body of a valve. The body of the device comprises a control rod at its center and movable along its longitudinal axis. The lower portion of the rod is adapted to be mechanically connected by being coupled to a movable portion of the valve itself. The upper portion of the rod is mechanically connected to a piston, movable in translation along the longitudinal axis. The upper portion of the body comprises an attached part forming the cavity in which the piston is housed. This cavity and the upper surface of the piston form a control chamber of the device. A connection port for pressurized fluid is provided at the center of the attached upper portion of the body. A spring is provided between the lower surface of the piston and the body of the device in order to maintain the control rod in the upper position in the absence of pressure in the control chamber. This position corresponds to a closed position of the valve. When the control chamber is supplied with pressurized fluid, the piston exerts a force opposing that of the spring, causing the rod to move down and open the valve. A mechanical locking device is provided. It consists in blocking the rod in the upper position by means of a control thumbwheel acting on a conical-ended rod sliding along a direction, perpendicular to the longitudinal axis. A groove corresponding to the conical end is housed in the rod.

The device is advantageously simply designed, yet has a slew of drawbacks. Indeed, the locking means are outside of the device and not integrated. Moreover, the means require a manual control of the tightening, which can cause the locking means to deteriorate and/or possibly, an unsatisfactory locking. The locking of this device, because of its mechanical design, has limited power and cannot be applied to an actuator with a demultiplication of the force. Indeed, having a larger piston surface might cause, if the pressurized control fluid is present in the chamber, the blocker of the seat to be blocked and thus to slightly open the valve in spite of the locking means.

Document EP 1 426 626 A1 discloses a valve for a gas bottle comprising a closing valve and a control device of the valve. The valve per se is of the conventional type, that is, comprising a movable blocker along the longitudinal axis and cooperating in a sealed manner with a machined seat in the body of the valve. The control device is of the pneumatic type, that is, activated by intake of pressurized air. It comprises a piston, movable along the longitudinal axis of the valve and connected to the blocker via demultiplication means. These means comprise four rollers housed in a chamber, symmetrically with respect to a plane comprising the longitudinal axis. A needle is rigidly connected to the piston and has the ability to come in contact via its inclined surfaces with two of the four rollers. The penetration of the needle in the rollers causes the two upper rollers to move apart which, because of their lateral displacement, push the two lower rollers downward. These two lower rollers are connected to a common movable bearing which is supported on the control rod of the actuator. The pressure of the needle thus causes the valve to close. The piston is subjected to the closing forces of the valve generated by two concentric springs. A chamber is formed by the inner surface of the piston and the cavity of the body. This chamber can be supplied with pressurized air in order to move the piston upward so as to open the valve. The device comprises locking means at the top of the body of the device. These means comprise a threaded ring with a lower surface having an inclined wall, two diametrically opposed pushers in contact with the inclined wall of the ring and in contact with a top tapered portion of the piston. Making the ring move down by a tightening movement displaces, via its tapered lower surface, the two pushers toward the center of the device. These two pushers come into pressure against the tapered surface of the top portion of the piston and thus prevent the latter from returning upward at all.

Although this device has an interesting functionality, it also has several drawbacks. Indeed, manufacturing this device is rather complicated because of the large number of pieces, some of which require a complex and costly machining such as, for example, the rollers, the bearing of the rollers, and the pushers. Assembling such a device is also rather complex because of the number of pieces which need to be precisely adjusted. Additionally, activating the locking means requires a tightening operation which, with the teaching of the previous document, can cause the locking means to deteriorate and/or possibly to have unsatisfactory locking.

DESCRIPTION OF THE INVENTION

The object of the invention is to overcome at least one of the above-mentioned drawbacks. The invention consists of a device for controlling a valve, comprising: a body of the device with a longitudinal axis; a control member of the valve, housed at least partially in the body at a bottom portion along the longitudinal axis; a piston, movable along the longitudinal axis, the piston being housed in a portion of the body forming, with the piston, the control chamber of the piston; this chamber being adapted to be connected to a pressurized fluid intake; the device being built so that the piston is adapted to transmit its movement to the control member in view of controlling the valve; the device further comprising an element, movable in rotation with respect to the longitudinal axis on an upper portion of the body; the movable element comprising a connection port of the pressurized fluid off-centered with respect to the longitudinal axis; the control chamber comprising, opposite the movable element, a passage, also off-centered to the connection port; sealing means between the movable element and the control chamber in the area of the connection port and/or of the passage, so as to provide sealing of the feedstream when the connection port and the passage are aligned by adequately manipulating the movable element.

This device has a simple security measure consisting in acting directly on the pressurized fluid intake. This security is particularly interesting in that it acts directly on the source of the force and can be activated by simple rotation of a movable element of the device. This makes it possible to combine it with other locking means which can thus be activated or deactivated by a simple single manipulation.

Advantageously, the movable element comprises a disc-shaped portion, perpendicular to the longitudinal axis and comprising the connection port, the control chamber comprises an outer planar surface vis-à-vis which the disc-shaped portion of the movable element moves in rotation.

Advantageously, the movable element comprises a generally cylindrical portion. The control chamber is formed by an open cavity of the body on which a lid-shaped element is fixed, preferably by being screwed, said lid-shaped element comprising the outer planar surface of the control chamber.

Advantageously, the sealing means are placed in the area of the movable element.

Advantageously, the sealing means comprise a joint housed in a groove outlining the orifice of the connection port and formed in the inner surface of the disc-shaped portion of the movable element.

Advantageously, the outer planar surface of the control chamber comprises a track for the sealing means placed in the area of the movable element.

Advantageously, the track cooperates in a sealed manner with the sealing means of the movable element so as to form the connection port when it is spaced from the passage of the control chamber.

Advantageously, the sealing means are placed in the area of the control chamber, preferably the sealing means comprise a joint placed in a groove outlining the passage and formed in the outer planar surface of the control chamber.

Advantageously, the disc-shaped portion of the movable element comprises a track moving by gliding on the sealing means during the rotation of the movable element.

Advantageously, the device comprises mechanical blocking means of the control member of the valve with respect to the body of the device, the mechanical blocking means being preferably activated by the rotation of the movable element.

Advantageously, the mechanical blocking means comprise a ring for activating said means, the ring being mounted around the body of the device via a threading, the ring comprising a mechanical connection in rotation with the movable element.

Advantageously, the body comprises a push-button adapted to cooperate with the activation ring in view of indexing its position.

Advantageously, the movable element is located opposite the ring and comprises a series of cylindrical elements mounted in bores parallel to the corresponding longitudinal axis and cooperating with corresponding notches housed in the ring along the longitudinal axis.

Advantageously, the mechanical blocking means comprise radial compression elements cooperating with a surface, inclined with respect to the longitudinal axis of the ring and a surface, inclined with respect to the longitudinal axis of the control member.

Advantageously, the radial compression elements comprise steel beads.

Advantageously, means for visualizing the opening or closing state of the valve connected to the device are provided in the area of the central and upper portions of the device.

These means can consist in an element attached to the piston and adapted to slide in a sealed manner with the upper wall of the control chamber.

Other particularities of the invention will become apparent from the description of the example of embodiment shown in the drawings.

BEST EMBODIMENT OF THE INVENTION

Figure 1:
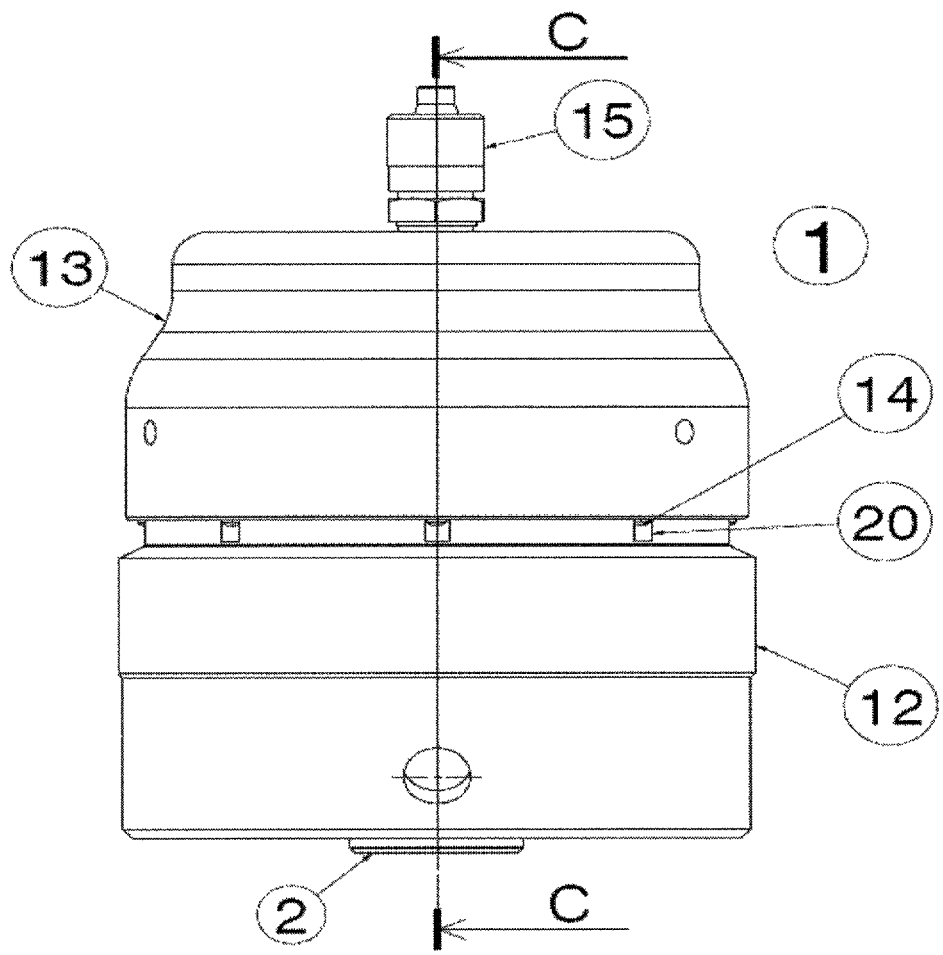
FIG. 1 is a planar view of the valve control device according to the invention.

The following description makes reference to geographical terms such as "upper", "top", "lower", and "bottom". These terms are used by way of example only in relation to the orientation of the device in the drawings, and for clarification purposes. These terms must not be interpreted as absolute and limiting, but rather only in relation to the orientation and application of the device according to the drawings.

Figure 2:
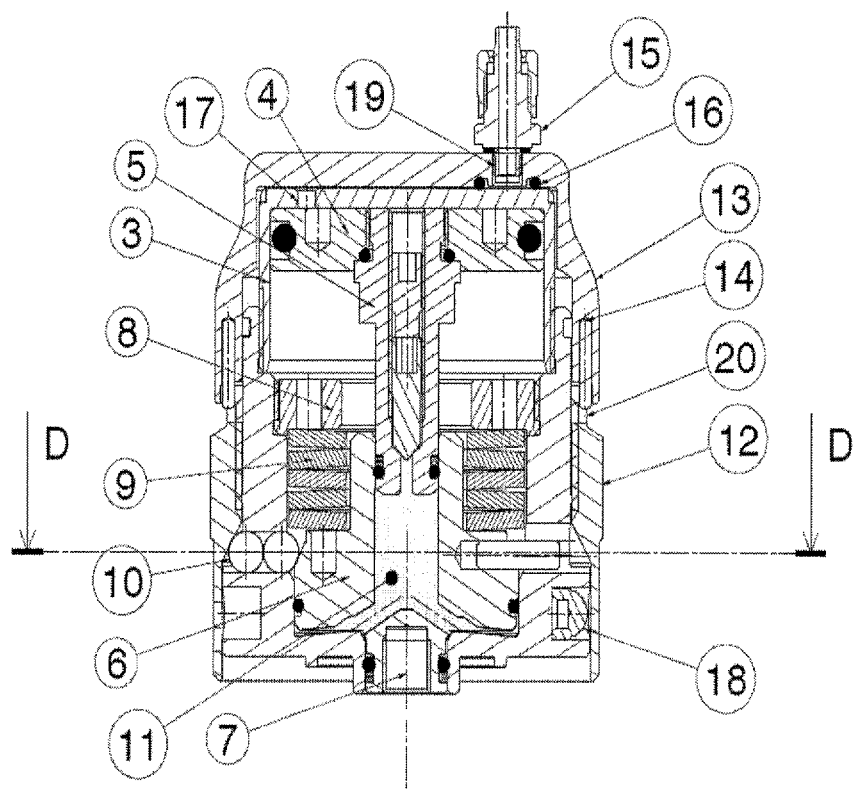
FIG. 2 is a cross-sectional view along the axis C-C of the device of FIG. 1.
Figure 3:
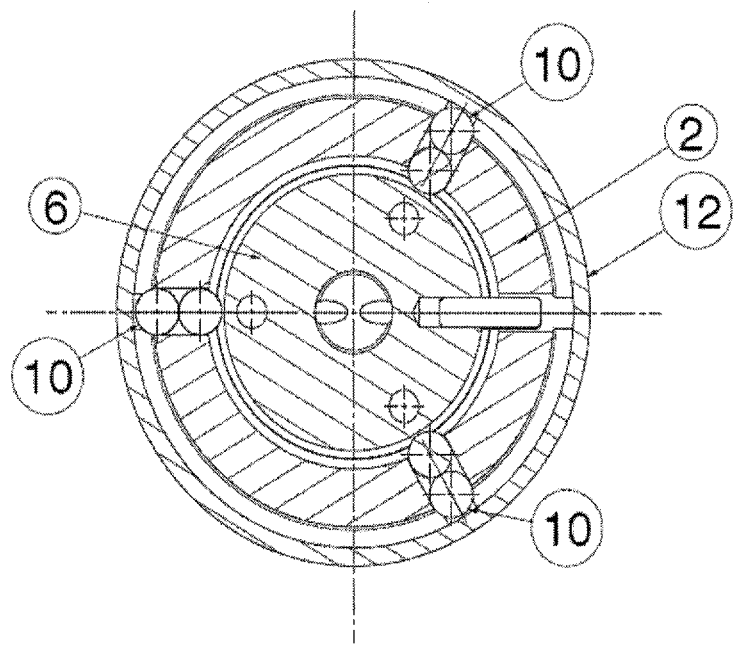
FIG. 3 is a cross-sectional view along the axis D-D of the device of FIG. 2.

A valve control device according to the invention is shown in FIGS. 1, 2, and 3. FIG. 2 shows best the details of construction of the device, FIGS. 1 and 3 showing best certain particular technical aspects. The description of the construction of the device shall therefore be based, first on FIG. 2, and then on FIGS. 1 and 3 for the corresponding technical aspects.

The valve control device 1 shown in FIG. 2 comprises a body constituted essentially of two elements, a main element 2 and an element 3 threadably attached. A control member 6 is housed slidably along the longitudinal axis of the device. This control member 6 comprises, at its lower end, means for attachment to a valve blocker (not shown). These attachment means are made, in the case of this embodiment, by a threaded bore 7. The control member 6 is part of a mechanism for stepping down the control force which is described hereinafter.

A piston 4 is housed in the upper element 3 of the body of the device. This element 3 comprises a lower cylindrical portion in which the piston 4 is housed so as to slide along the longitudinal axis of the device. The main element 2 of the body further comprises a through-hole for guiding the lower end of the control member 6, a cavity essentially symmetrical in revolution adapted to receive the control member. The latter comprises a larger cylindrical portion adapted to slide in the body 2. The inner surface of this cylindrical portion defines, with the sealing means present between the cylindrical portion and the cavity of the body 2 and between the lower end and the through-hole of the body 2, a high-pressure chamber 11 filled with oil. The control member further comprises a narrower upper portion shaped as a chimney. A stack of springs 9 of the Belleville type is pulled on around this top portion of the control member. These springs are supported on an abutment 8 housed and fixed in the body 2 by threading. These elastic means thus exert a permanent force on the control member 6 directed downwardly in the closing direction of the valve.

The top portion of the control member comprises a cylindrical bore opening out onto its upper end. A hydraulic piston 5 is housed slidably and sealedly in this bore. The hydraulic piston 5 is rigidly connected to the pneumatic piston 4. The sealing means (here conventionally an O-ring type joint) between the hydraulic piston and the bore of the control member form the hydraulic chamber 11. The hydraulic piston 5 comprises means for filling with control and closing oil.

The upper surface of the pneumatic piston 4 and the upper element 3 of the body of the device form a control chamber of the piston. In FIG. 2, the chamber is reduced to an almost null volume since the piston is in contact with the inner surface of the disc-shaped portion of the upper element 3. Once this chamber has been supplied with compressed air, the upper surface of the piston 4 is subjected to a force resulting from the air pressure present in the chamber and from the effective surface of the piston. This force makes the pneumatic piston 4 and the hydraulic piston 5 move down. The latter, by moving downwardly, increases the oil pressure in the chamber 11, which makes the control member 6 move back up against the force of the springs 9 and causes the valve to open. This demultiplication mechanism allows for reversing the control force of the pneumatic piston and also for amplifying the control force. Indeed, the force to which the control member 6 is subjected by the hydraulic fluid in the chamber 11 corresponds to the control force of the pistons 4 and 5 multiplied by the ratio of surfaces between the effective surface of the control member (the ring on its lower surface) and the effective surface of the hydraulic piston 5 (neglecting friction losses).

Mechanical locking means are provided in the area of the control member 6. They comprise three pairs of beads arranged in through-holes perpendicular to the longitudinal axis. Each pair of beads is housed in a respective through-hole; these through-holes are uniformly distributed along axes at 120° from one another. Each through-hole opens out onto the outside and the inside of the main element 2 of the body. The control member comprises a section whose lateral surface is inclined. The most central bead of each pair is in contact with this surface section. These pairs of beads are movable along the through-hole axis so as to serve as a mechanical abutment for the surface section of the control member. A ring 12 for activating locking means is provided around the main element 2 of the body of the device. This ring 12 has a generally cylindrical shape with an outer surface that is knurled to facilitate manipulation. The ring 12 is mounted on the body by means of a threading in order to be able to displace it along the longitudinal axis by a manipulation in rotation. It comprises opposite the through-holes in which the beads are housed a continuous symmetrical surface in revolution which is inclined. The effect of the progressive downward movement of the ring 12 by manipulation in rotation is to displace the pairs of beads slightly toward the longitudinal axis of the device and to put them in pressure against the section of inclined surface of the control member, thus ensuring a mechanical locking. The surface section is inclined so that the pressure of the beads on it generates a force directed downwardly, which is the closing direction of the valve.

The air or fluid intake under pressure in the control chamber is controlled by the position of the movable element 13. The latter has the shape of a bell or that of a cylinder closed at the top by a disc-shaped surface. It is movably mounted in rotation on the body of the device supported on the outer surface of the main element 2 and the upper element 3 of the body of the device. It is kept in place by a series of screws arranged radially in the thickness of the skirt so as to cooperate with a groove (no reference number) provided in the top portion of the main element 2 of the body. The location of these screws can be visualized by the two small circles in the area of the skirt of the movable element 13 of FIG. 1. The movable element 13 comprises a port 19 for connecting to a source of pressurized fluid. This port is in fact a threaded orifice in which a connection coupling 15 is screwed. This connection port 19 is off-centered with respect to the longitudinal axis. The orifice of the port 19 opens out onto the inner surface of the disc-shaped portion of the movable element 13. The outer upper surface of the upper element 3 of the body of the device is located opposite the inner surface of the disc-shaped portion of the movable element 13. It comprises a through orifice 17 similarly off-centered with respect to the connection port 19. This through orifice is directly connected to the control chamber of the pneumatic piston 4 and constitutes the only connection for supplying this chamber with compressed fluid. Sealing means are provided in the area of the connection port 19. They consist of a joint 16, typically of the O-ring type, arranged in a groove formed in the inner surface of the movable element 13 and surrounding the orifice of the connection port 19. This joint 16 is adapted to ensure the sealing of the feedstream supplying the control chamber when the connection port 19 and the through orifice 17 are aligned.

Housing the joint into a groove ensures a better hold than a simple spot facing. In addition, the inner diameter of the joint is greater by a ratio of at least 2 to 1, preferably 3 to 1, with respect to the inner diameter of the through orifice. This measurement allows for the joint to pass above the through orifice without getting hooked. The outer upper surface of the upper element 3 of the body of the device constitutes a track along which the joint 16 slides when the movable element 13 is manipulated in rotation. When the movable element 13 is in an angular position such that the joint 16 is completely spaced from the through orifice 17, the pressurized fluid intake is closed and, in addition, the control chamber of the pneumatic piston 4 is open out to the air by the intrinsic leaks between the outer and the inner surfaces of the upper element 3 of the body and the movable element 13, respectively. The manipulation in rotation of the movable element plays the role of a valve for pressurizing or placing in the air the control chamber and also the role of closing the pressurized fluid intake. This constitutes an additional security which can become necessary due to the large demultiplication ratio of the device. Indeed, although the mechanical locking means act directly on the control member 6 of the valve, they can become insufficient to prevent the closing, even partial, of the valve when the control chamber of the pneumatic piston is supplied with air. Cutting the air supply of the chamber provides additional security.

Connecting means in rotation are provided between the movable element 13 and the locking ring 12. They consist of small cylinders or pins 14 housed in parallel to the longitudinal axis in through holes in the section of the lower portion of the movable element 13. These through holes are uniformly distributed on the periphery of the movable element 13. These pins 14 project slightly over the section of the lower portion of the movable element 13. The outer surface of the ring 12 is provided, at its upper edge, with a series of recesses 20, partially cylindrical and parallel to the longitudinal axis of the device and uniformly distributed on the periphery so as to correspond with the pins 14. Thus, the ends of the projecting pins of the movable element 13 cooperate with the recesses or notches 20 so as to provide a rotational connection between the movable element and the activation ring of the mechanical locking means while allowing for a relative displacement between these two along the longitudinal axis. The rotational manipulation of the ring 12 thus drives the movable element 13.

A push-button 18 is provided at the bottom of the main element of the body of the device, arranged along a radial direction, perpendicular to the longitudinal axis. The push-button thus cooperates with a corresponding orifice provided in the lower portion or skirt of the ring 12. During the rotational manipulation of the ring, the push-button, once aligned, penetrates in the orifice of the skirt of the ring 12. This corresponds to the operational position of the device whereby the mechanical locking means are deactivated and the connection port 19 and the through-orifice 17 of the control chamber are aligned.

Means for visualizing the closed and/or open state of the valve connected to the device can be provided at the top of the device (not shown in the drawings). These means can comprise an element attached to the piston 4 and capable of moving along the longitudinal direction in a sealed manner with the upper element 3 of the body forming the upper wall of the control chamber. Indeed, this upper element can have a central extension in the shape of a chimney or cylinder with sealing means cooperating with a visualization cylindrical element (not shown) moving along the longitudinal axis along with the piston 4. The movable element can comprise a central opening at its upper portion which cooperates with the cylindrical extension at the top of the upper element of the body of the device. This cylindrical portion can have the shape of a chimney or boss depending on the application. A transparent lid could be fixed at the top of the device to protect this visualization element and the sealing means while allowing for visualizing the position of the element. Various alternatives or improvements of the visualization means known to one having ordinary skill in the art are naturally applicable to this device, knowing that it is the fact of off-centering the port of connection to the pressurized fluid that frees, in an inventive manner, the central portion of the top of the device.

Although the invention is fully realized in combination with a mechanism for amplifying the force resulting from the pneumatic portion and with mechanical locking means, nevertheless, the very essence of the invention is applicable to other configurations, in particular to a control device comprising a pneumatic portion and without amplification and/or without locking means. The principle of controlling the supply of pressurized fluid remains applicable and presents the same advantages of security.

Various alternatives to the exemplary embodiment described above can be envisioned. Indeed, the amplification device with the oil chamber can be replaced with other amplification devices. The movement inversion provided by the device of amplification with oil is not compulsory. Indeed, it could be envisioned for the chamber in question to be on the other surface of the piston portion of the control member so as to displace it downwardly in case of pneumatic piston control. In this case, the springs or other elastic means would be arranged on the other side, that is, on the side of the chamber according to FIGS. 1-3 and the device would be applicable to a valve whose closing would be carried out by an upward movement of the blocker. The mechanical blocking means do not necessarily have to comprise beads. Various equivalent alternatives can be envisioned, such as, for example, cylindrical pushers. Only one or three beads per through hole is also possible as a function of the thickness of the wall of the body of the device. The number of through holes depends on the overall size of the device. Only two diametrically opposed through holes or four or even more, distributed uniformly, or not, could also be provided.

The sealing means between the connection port 19 and the through orifice 17 of the control chamber can be arranged on the outer surface of the upper element 3 of the body, similarly to the arrangement of FIGS. 1-3. In this case, the connection port would be opened out to the air as soon as it would be spaced from the sealing means. In such position, the control chamber would be closed insofar as the sealing means would be in sealed contact with the inner surface of the movable element. The portion of this surface serving as a track for the sealing means could also be made to prevent leaks and place the chamber in ambiance.

Other rotational connection means between the movable element and the activation ring of the mechanical locking means can be envisioned.

The invention claimed is:

1. Valve control device, comprising:
   a body of the device with a longitudinal axis;
   a control member of a valve, housed at least partially in the body in a bottom portion along the longitudinal axis;
   a piston, movable along the longitudinal axis, the piston being housed in a portion of the body forming with the piston a control chamber of the piston, the chamber being adapted to be connected to a pressurized fluid, the device being manufactured for the piston to be able to transmit its movement to the control member in view of controlling the valve;
   wherein the device further comprises:
   a movable element, that can be manipulated in rotation with respect to the longitudinal axis on a top portion of the body; the movable element comprising a connection port of the pressurized fluid off-centered with respect to the longitudinal axis;
   the control chamber comprising an outer planar surface vis-à-vis which the movable element moves in rotation, the outer planar surface comprising, facing the movable element, a passage, also off-centered, to the connection port;
   a joint between the movable element and the control chamber in the area of the connection port and/or of the passage, so as to provide sealing of the feedstream when the connection port and the passage are aligned by appropriate manipulation of the movable element; and wherein
   the disc-shaped portion of the movable element comprises a track moving by gliding on the joint during the rotation of the movable element.

2. The valve control device according to claim 1, wherein the movable element comprises a disc-shaped portion perpendicular to the longitudinal axis and comprising the connection port.

3. The valve control device according to claim 2, wherein the movable element comprises a generally cylindrical portion and the control chamber is formed by an open cavity of the body on which a lid-shaped element is fixed by being screwed, said lid-shaped element comprising the outer planar surface of the control chamber.

4. The valve control device according to claim 2, wherein the joint is located in the area of the movable element.

5. The valve control device according to claim 4, wherein the joint is housed in a groove outlining an orifice of the connection port, the latter being formed in the inner surface of a disc-shaped portion of the movable element.

6. The valve control device according to claim 4, wherein the outer planar surface of the control chamber comprises a track for the joint placed in the area of the movable element.

7. The valve control device according to claim 6, wherein the track cooperates in a sealed manner with the joint of the movable element so as to close the connection port when it is spaced from the passage of the control chamber.

8. The valve control device according to claim 2, wherein the joint is placed in the area of the control chamber.

9. The valve control device according to claim 8, wherein the mechanical blocking means is activated by the rotation of the movable element.

10. The valve control device according to claim 9, wherein the mechanical blocking means comprises an activation ring of said means, the ring being mounted around the body of the device via threading, the ring comprising a mechanical connection in rotation with the movable element.

11. The valve control device according to claim 10, wherein the body comprises a push-button adapted to cooperate with the activation ring in view of indexing its position.

12. The valve control device according to claim 11, wherein the movable element faces the ring and comprises a series of cylindrical elements mounted in bores parallel to the corresponding longitudinal axis and cooperating with corresponding notches housed in the ring along the longitudinal axis.

13. The valve control device according to claim 11, characterized in that the mechanical blocking means comprise radial compression elements cooperating with a surface, inclined with respect to the longitudinal axis of the ring and a surface, inclined with respect to the longitudinal axis of the control member.

14. The valve control device according to claim 13, wherein the radial compression elements comprise steel beads.

\* \* \* \* \*